United States Patent
Michael et al.

(10) Patent No.: US 7,493,618 B2
(45) Date of Patent: Feb. 17, 2009

(54) FAULT TOLERANT MUTUAL EXCLUSION LOCKS FOR SHARED MEMORY SYSTEMS

(75) Inventors: Maged M. Michael, Danbury, CT (US); Yong-Jik Kim, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1418 days.

(21) Appl. No.: 10/665,700

(22) Filed: Sep. 19, 2003

(65) Prior Publication Data
US 2005/0066064 A1   Mar. 24, 2005

(51) Int. Cl.
G06F 9/46 (2006.01)
G06F 13/24 (2006.01)
G06F 7/00 (2006.01)
G06F 11/00 (2006.01)
G06F 12/00 (2006.01)

(52) U.S. Cl. .................. 718/102; 718/100; 718/106; 718/107; 710/200; 707/8; 707/9; 707/10; 714/10; 714/11; 714/15; 711/147; 711/148

(58) Field of Classification Search ......... 718/100–108; 710/200; 714/10, 15, 41; 707/8–10; 711/147–148
See application file for complete search history.

(56) References Cited

U.S. PATENT DOCUMENTS

| | | | | |
|---|---|---|---|---|
| 4,604,694 A | * | 8/1986 | Hough ................ | 710/200 |
| 5,524,215 A | * | 6/1996 | Gay .................... | 710/107 |
| 5,550,973 A | * | 8/1996 | Forman et al. ......... | 714/10 |
| 5,590,326 A | * | 12/1996 | Manabe .............. | 711/150 |
| 5,630,136 A | * | 5/1997 | Davidson et al. ....... | 718/106 |
| 5,946,711 A | * | 8/1999 | Donnelly .............. | 711/152 |
| 5,991,845 A | * | 11/1999 | Bohannon et al. ...... | 710/200 |
| 6,029,190 A | * | 2/2000 | Oliver ................. | 718/107 |
| 6,105,049 A | * | 8/2000 | Govindaraju et al. .... | 718/102 |
| 6,105,059 A | * | 8/2000 | Al-Karmi et al. ....... | 709/219 |
| 6,189,007 B1 | * | 2/2001 | Boonie et al. ........... | 707/8 |
| 6,301,676 B1 | * | 10/2001 | Kumar et al. .......... | 714/11 |
| 6,467,050 B1 | * | 10/2002 | Keung ................. | 714/27 |
| 6,499,048 B1 | * | 12/2002 | Williams .............. | 718/102 |

(Continued)

OTHER PUBLICATIONS

Muller, "A Library Implementation of Posix Threads Under Unix", Florida State University, Usenix, 1993, pp. 29-42.*

(Continued)

*Primary Examiner*—Lewis A. Bullock, Jr.
*Assistant Examiner*—Jennifer N To
(74) *Attorney, Agent, or Firm*—F. Chau & Associates, LLC

(57) ABSTRACT

The present invention provides a method of implementing a fault-tolerant mutual exclusion lock. The present invention records in a lock structure the IDs of all processes whose failure can lead to the permanent unavailability of the lock. When a process finds the lock unavailable and suspects a permanent failure, it queries the programming environment about the status of all or some of the processes that could have caused the lock's unavailability. If the programming environment determines that these processes have failed, the live process tries to usurp the lock. If it succeeds, it executes some recovery mechanism and frees the lock or proceeds to operate on the objects protected by the lock. The method guarantees recovery from process failures.

1 Claim, 7 Drawing Sheets

U.S. PATENT DOCUMENTS

| | | | |
|---|---|---|---|
| 6,990,560 B2 * | 1/2006 | Armstrong et al. | 711/152 |
| 7,284,151 B2 * | 10/2007 | Chandrasekaran | 714/9 |
| 7,415,556 B2 * | 8/2008 | Kawachiya et al. | 710/244 |
| 2001/0014905 A1 * | 8/2001 | Onodera | 709/102 |
| 2003/0159086 A1 * | 8/2003 | Arndt | 714/25 |
| 2004/0268062 A1 * | 12/2004 | Ofer | 711/152 |
| 2005/0022047 A1 * | 1/2005 | Chandrasekaran | 714/4 |

OTHER PUBLICATIONS

Valois, "Lock-Free Link Lists: Using Compare-and-Swap", ACM, 1995, pp. 214-222.*

* cited by examiner

```
// Lock variables
LockHolder : ProcessIdType;
LastChecked : TimeType;

AcquireLock (p : ProcessIdType)
    while true {
A1:     if (holder ← LockHolder) = NULL {
A2:         if CAS(&LockHolder, NULL, p)
A3:             {LastChecked ← Time(); return; }
        } else {
A4:         last ← LastChecked ;
A5:         time ← Time();
A6:         if time - last < THRESHOLD continue;
A7:         if ¬CAS(&LastChecked, last , time) continue;
A8:         if QueryOS(holder) = ALIVE continue;
A9:         if CAS(&LockHolder, holder, p)
A10:            {UserRecovery (...); return; }
        }
    }

ReleaseLock ()
R1: ResetRecovery (...);
R2: LockHolder ← NULL;
```

```
structure NodeType
  Pid : ProcessIdType;
  Status : ⟨{WAITING, HASLOCK, FAILED, REMOVED,
            TO_BE_REMOVED}, TagType⟩;
  Next : (*NodeType, TagType);
  LastChecked : TimeType;
  Signal : *NodeType;
  Ack : boolean;
Head, Tail : (*NodeType, TagType) initially NULL;
LockHolder : *NodeType initially NULL;

PS_AcquireLock(node : *NodeType)
a1: repeat until TryLock(node) = HASLOCK;

PS_ReleaseLock(node : *NodeType)
r1: ResetRecovery(...);
r2: next ← Dequeue(node);
    while next = NULL {
r3:   ⟨status, t⟩ ← next^.Status;
r4:   If CheckPreemption(node, next) = ACTIVE {
r5:     CAS(&LockHolder, node, NULL);
r6:     CAS(&next^.Status, ⟨status, t⟩, ⟨HASLOCK, t+1⟩);
r7:     return;
      }
r8:   next^.Status ← ⟨TO_BE_REMOVED, t+1⟩;
r9:   ptr ← Dequeue(next);
r10:  CAS(&next^.Status, ⟨TO_BE_REMOVED, t+1⟩, ⟨REMOVED, t+2⟩);
      next ← ptr;
    }
r11: CAS(&LockHolder, node, NULL);

CheckPreemption(node, next : *NodeType) : {ACTIVE, PREEMPTED}
c1: node^.Ack ← false;
c2: next^.Signal ← node;
c3: for j ← 0 to PREEMPTION_THRESHOLD
c4:   If node^.Ack return ACTIVE;
c5: return PREEMPTED;

TryLock(node : *NodeType) : {HASLOCK, REMOVED}
t1: Enqueue(node);
t2: old_head ← Head.Data; ptr ← old_head;
    while true {
t3:   If ⟨status ← PS_WaitForSignal()⟩ = HASLOCK {
t4:     node^.LastChecked ← Time();
t5:     LockHolder ← node; return HASLOCK;
      }
t6:   elseif status = REMOVED return REMOVED;
t7:   holder ← LockHolder;
t8:   head ← Head.Data;
t9:   ⟨status, t⟩ ← node^.Status;
      If status = TO_BE_REMOVED ∧ node ≠ head
t10:    {node^.Status ← ⟨REMOVED, t+1⟩; return REMOVED; }
t11:  If head ≠ old_head {
t12:    old_head ← head; head, ptr ← head;
t13:  } elseif ptr ≠ node {
t14:    ptr ← ptr^.Next.Data;
      } else {
t15:    old_head ← head, ptr ← head;
t16:    If holder ≠ NULL ∧ holder ≠ head {
t17:      If ¬ProcessFailed(holder, head) continue;
t18:      If holder ≠ LockHolder continue;
        }
t19:    If UsurpLock(node, head) return HASLOCK;
      }
    }

PS_WaitForSignal(node : *NodeType) : {HASLOCK, REMOVED, TIMEOUT}
w1: last ← Time();
w2: node^.Signal ← NULL;
    while true {
w3:   If (ptr ← node^.Signal) = NULL {
w4:     ptr^.Ack ← true;
w5:     node^.Signal ← NULL;
      }
w6:   status ← node^.Status.Data;
w7:   If status ∈ {HASLOCK, REMOVED} return status;
w8:   time ← Time();
w9:   If time − last > THRESHOLD return TIMEOUT;
    }
```

Figure 6

// MAX is the maximum number of updates in a CS
structure *LogType*
    *count* : 0..MAX; // initially 0
    *addr*[MAX] : pointer;
    *prev*[MAX] : *ValueType*;

*WriteAndLog*(*addr* : pointer, *v* : *ValueType*)
    *log.prev*[*log.count*] ← *addr*;
    *log.addr*[*log.count*] ← *addr*;
    *log.count* ← *log.count* + 1;
    *addr* ← *v*;

*UserRecovery* ()
    for *i* ← *log.count* - 1 downto 0
        *log.addr*[*i*] ← *log.prev*[*i*];
    *log.count* ← 0;

*ResetRecovery* ()
    *log.count* ← 0;

Figure 7

FAULT TOLERANT MUTUAL EXCLUSION LOCKS FOR SHARED MEMORY SYSTEMS

BACKGROUND OF THE INVENTION

1. Field of the Invention

The present invention relates to mutual exclusion locks for synchronizing access to shared data, and, more particularly, to fault tolerant mutual exclusion locks for synchronizing access to shared data.

2. Description of the Related Art

In shared memory computing systems, processes in multi-process programs communicate by reading and writing shared data objects located in a shared memory. FIG. 1 illustrates one embodiment of a shared memory computing system 100, known to one skilled in the art. As illustrated, the shared memory computing system 100 may execute one or more processes 100. One or more processes 100 can access one or more shared address spaces 110, which is also located in the shared memory computing system 100. Each of the one or more shared address spaces 110 contains one or more shared data objects 115. One or more shared data objects 115 can be protected by one or more mutual exclusion locks 120.

Updating a shared data object often involves multiple steps. A process may be interrupted in the middle of such sequences of steps, and, if the sequence is not protected by some mechanism, updates to the shared data object by multiple processes may occur concurrently and result in corrupting the shared data object. For example, a shared counter initially holds the value 10. Two processes read that value and then simultaneously write to the shared counter the value 11. The result is that the shared counter is corrupted because the correct value should be 12.

Conventionally, mutual exclusion locks are used to guarantee exclusive access to a shared data object by one process at a time. Several such locking methods are known and are widely used. Some are more suitable for small and low-contention systems, such as the Test-and-Set lock and the Test-and-Test-and Set Lock. Others are more suitable for high-contention systems, such as queue-based locks. One or more shared data objects may be protected by one or more mutual exclusion locks. To update a shared data object, for example, a shared counter protected by a lock, a process must first acquire the lock associated with the shared data object, execute a sequence of operations on the shared data object, and then release the lock. The sequence of operations in the case of the shared counter is reading the shared counter's value and then writing a new value that is one more than the previously read value (i.e., incrementing the shared counter by one). A mutual exclusion lock guarantees that the shared data object cannot be held by more than one process at the same time. A process is said to "hold a lock" if the process has acquired the lock but has not released it yet.

However, while holding a mutual exclusion lock, a process may fail for a variety of reasons, such as accidental or intentional termination by a human, lack of system resources, heuristic deadlock recovery mechanisms, etc. In such cases, without mechanisms for detecting and recovering from such a situation, the associated shared data object may remain locked indefinitely. Often human detection of the situation is needed and sometimes the only solution is restarting the system or the program.

Conventional locks in prior art do not detect and recover from process failures. FIG. 2A illustrates a possible implementation 200 of the operation of the Test-and-Test-and-Set lock, used on the vast majority of current shared memory systems. A process that needs to acquire the lock bit executes the lock acquire routine 210. The lock acquire routine 210 reads (at 215) the value of the lock bit in a private register. If the lock bit is busy (at 220) it continues to read (at 215) the value of the lock bit until the lock bit is not busy. Conventionally, the lock bit is busy if its value is one. If the lock bit is not busy (at 220), the process executes (at 225) a Test-and-Set operation on the lock bit. The Test-and-Set (TAS) operation is supported in hardware in one way or another on almost all current processors.

Referring now to FIG. 2B, the TAS operation 230 atomically (i.e., without interleaving access by other processes) reads (at 235) the value of a shared variable (in this case a lock bit). If the lock bit is clear (at 240), the TAS operation sets (at 245) the lock bit and returns (at 245) a value of one, indicating the lock bit is clear. If the lock bit is not clear (at 240), the TAS operation returns (at 250) a value of zero, indicating the lock bit is not clear.

Referring again to FIG. 2A, if the TAS operation 230 is not successful (i.e., the TAS operation 230 returns a value of one) (at 255), the lock acquire routine 210 restarts at step 215. If the TAS operation 230 is successful (i.e., the TAS operation 230 returns a value of zero) (at 255), the lock acquire routine 210 proceeds to operate (at 270) on the shared data object protected by the lock bit.

Referring now to FIG. 2C, a process that needs to release the lock bit executes the lock release routine 275. In the illustrated embodiment, the lock release routine 275 clears (at 280) the lock bit. Once the lock bit is cleared (at 280), the lock bit can be acquired by the same or another process.

It is obvious from the above description that a conventional lock such as the Test-and-Test-and-Set lock cannot recover if a process fails while holding it. Without external intervention, other processes may wait forever in the lock acquire routine 210 for a lock that will never be released. Current locks do not detect and recover from process failure that lead to a deadlock situation, where processes wait for an event that will never happen. As such, a fault tolerant mutual exclusion lock is needed to solve this problem.

SUMMARY OF THE INVENTION

In one aspect of the present invention, a method of implementing a mutual exclusion lock is provided. The mutual exclusion lock is capable of preventing at least one acquiring process from operating on at least one shared data object. The at least one acquiring process is identified by at least one acquiring process ID. The mutual exclusion lock includes at least one variable capable of storing the at least one acquiring process ID. Only the at least one acquiring process identified by the at least one acquiring process ID stored in the at least one variable can operate on the at least one shared data object. The method includes determining whether the mutual exclusion lock is clear; if the mutual exclusion lock is clear, storing the at least one acquiring process ID to the at least one variable, and operating on the at least one shared data object; and if the mutual exclusion lock is not clear and if at least one old process identified by at least old process ID stored in the at least one variable included in the mutual exclusion lock is dead, assigning the at least one acquiring process ID to the at least one variable, performing a recovery mechanism to recover the at least one data object to a consistent state, and operating on the at least one shared data object.

In another aspect of the present invention, another method of implementing a mutual exclusion lock is provided. The mutual exclusion lock is capable of preventing at least one acquiring process from operating on at least one shared data object. The at least one acquiring process is identified by at least one acquiring process ID. The mutual exclusion lock includes at least one variable capable of storing the at least one acquiring process ID. Only the at least one acquiring process identified by the at least one acquiring process ID stored in the at least one variable can operate on the at least one shared data object. The method includes comparing the at least one variable and a clear value; if the at least one variable is equal to the clear value, storing the acquiring process ID in the at least one variable, operating on the at least one shared data object, and writing the clear value to the at least one variable; if the at least one variable is not equal to the clear value, querying a programming environment if at least one old process identified by at least one old process ID is dead, wherein the at least one old process ID is equal to the at least one variable, if the at least one old process is dead, comparing the at least one variable and the at least one old process ID, if the at least one variable is equal to the at least one old process ID, storing the acquiring process ID in the at least one variable, performing a recovery mechanism to recover the at least one data object to a consistent state, operating on the at least one shared data object, resetting the recovery mechanism, and writing the clear value to the at least one variable; wherein the steps of comparing the at least one variable and the clear value and storing the at least one acquiring process ID in the at least one variable if the at least one variable is equal to the clear value are performed atomically; and wherein the steps of comparing the at least one variable and the at least one old process ID and storing the at least one acquiring process ID in the at least one variable if the at least one old process is dead are performed atomically.

In yet another embodiment of the present invention, a machine-readable medium having instructions stored thereon for execution by a processor to perform a method of implementing a mutual exclusion lock. The mutual exclusion lock is capable of preventing at least one acquiring process from operating on at least one shared data object. The at least one acquiring process is identified by at least one acquiring process ID. The mutual exclusion lock includes at least one variable capable of storing the at least one acquiring process ID. Only the at least one acquiring process identified by the at least one acquiring process ID stored in the at least one variable can operate on the at least one shared data object. The medium contains instructions for determining whether the mutual exclusion lock is clear; if the mutual exclusion lock is clear, storing the at least one acquiring process ID to the at least one variable, and operating on the at least one shared data object; and if the mutual exclusion lock is not clear and if at least one old process identified by at least old process ID stored in the at least one variable included in the mutual exclusion lock is dead, assigning the at least one acquiring process ID to the at least one variable, performing a recovery mechanism to recover the at least one data object to a consistent state, and operating on the at least one shared data object.

BRIEF DESCRIPTION OF THE DRAWINGS

The invention may be understood by reference to the following description taken in conjunction with the accompanying drawings, in which like reference numerals identify like elements, and in which:

FIG. 4 depicts a pseudo-code representation of a fault-tolerant mutual exclusion lock executed on the shared memory computer system of FIG. 1, in accordance with one embodiment of the present invention;

FIG. 5 depicts a pseudo-code representation of a fault-tolerant mutual exclusion lock executed on the shared memory computer system of FIG. 1, in accordance with one embodiment of the present invention;

FIG. 6 depicts a pseudo-code representation of a fault-tolerant mutual exclusion lock executed on the shared memory computer system of FIG. 1, in accordance with one embodiment of the present invention; and FIG. 7 depicts a pseudo-code representation of a recovery mechanism executed on the shared memory computer system of FIG. 1, in accordance with one embodiment of the present invention.

DETAILED DESCRIPTION OF PREFERRED EMBODIMENTS

Figure 1:
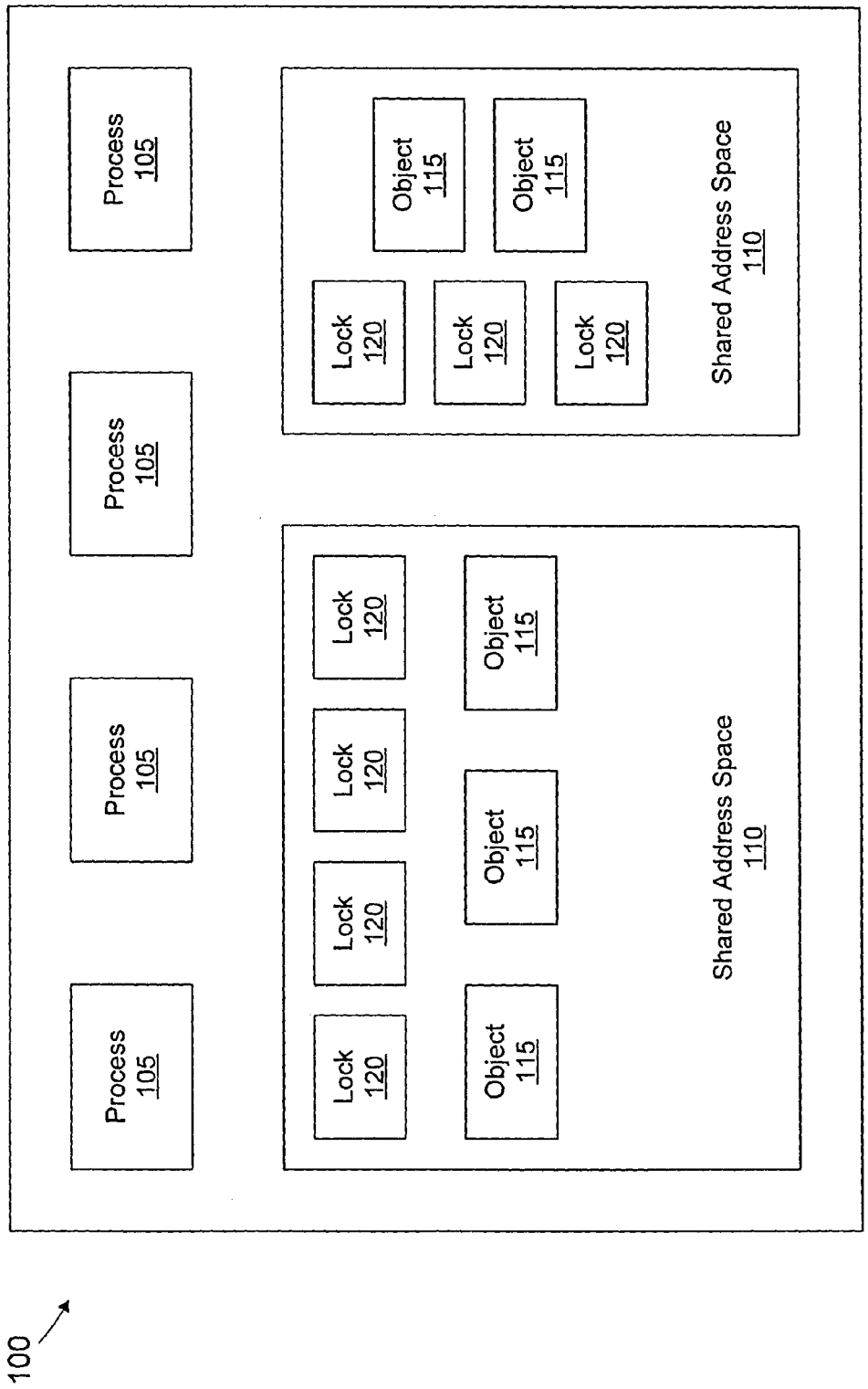
FIG. 1 depicts a typical shared memory computer system.
Figure 2B:
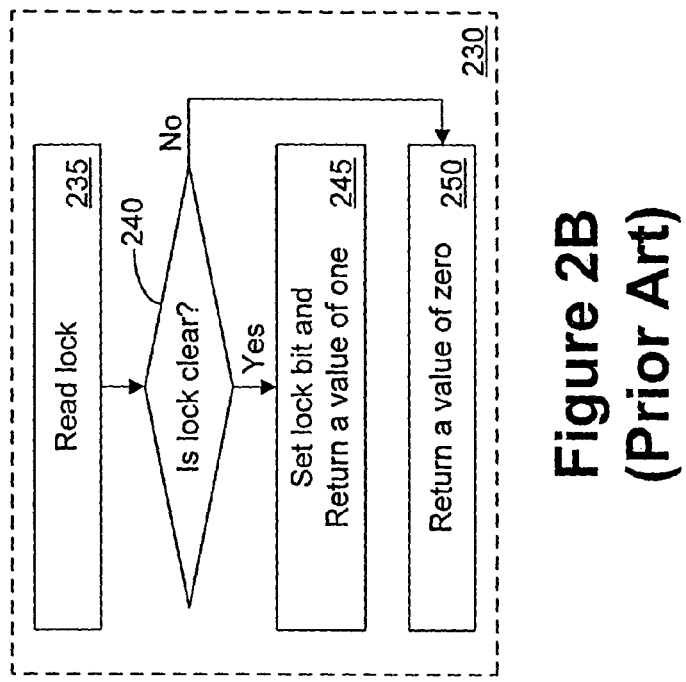
FIG. 2 depicts a flowchart representation of an exemplary centralized Test-and-Test-and-Set lock implemented on the shared memory computer system of FIG. 1.
Figure 2C:
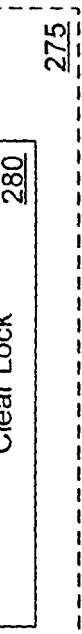
Figure 2A:
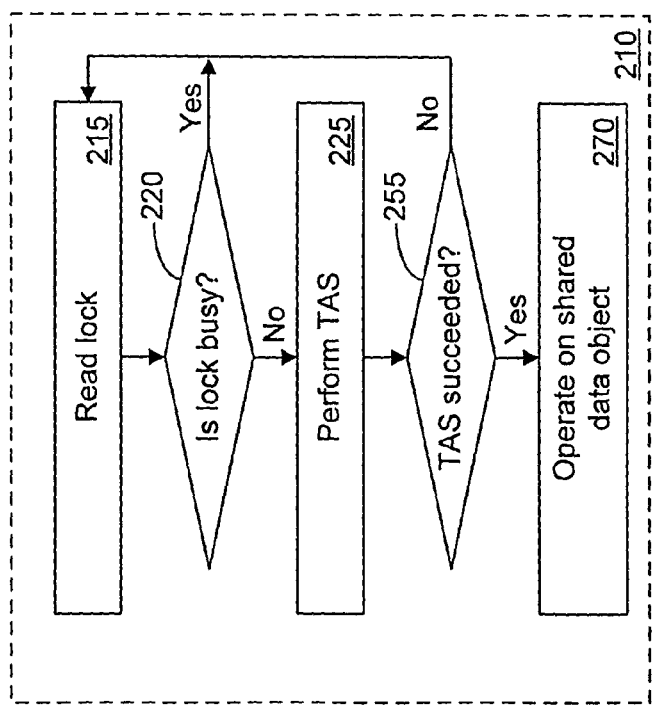

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachers herein, one of ordinary skill in the related art will be able to contemplate these and similar implementations of the present invention.

The present invention utilizes a unique ID (hereinafter referred to as a "process ID") with each process that acquires or seeks to acquire a lock. A lock structure comprises a conventional lock, as is known to those skilled in the art, as well as a lock variable for storing the process ID. Ideally, the lock structure stores the process IDs whose failure could lead to the permanent unavailability of the lock. Additionally, the lock structure may also be capable of storing a clear value. The clear value stored in the lock structure indicates the lock is not busy. Conversely, the process ID stored in the lock structure indicates the lock is busy. The clear value may be any value other than the ID. For example, the clear value may be NULL. Conventionally, NULL is represented by the value zero.

In an alternate embodiment, the lock structure may be a queue-based lock structure. The queue-based lock structure comprises the conventional lock as well as one or more lock variables for storing one or more process IDs and/or one or more clear values, as described above.

The clear values may be any value other than the one or more process IDs. In the queue-based lock structure, the variables are arranged in a queue structure. The queue structure is a data structure commonly known to those skilled in the art.

Implementations of the lock structure, as described herein, balance the speed of recovery while minimizing the frequency of queries to the programming environment, as these queries may be costly in execution time.

When a live process finds a lock unavailable and suspects permanent failure, the process queries the programming environment about the status of some or all of the processes that could have caused the unavailability of the lock (hereinafter referred to as "old processes"). The programming environment may include an operating system. If the programming environment determines that the old processes have failed, the live process attempts to usurp the lock. If the live process succeeds in usurping the lock structure, the live process executes a recovery mechanism and frees the lock structure or proceeds to operate on objects protected by the lock structure.

Figure 3:
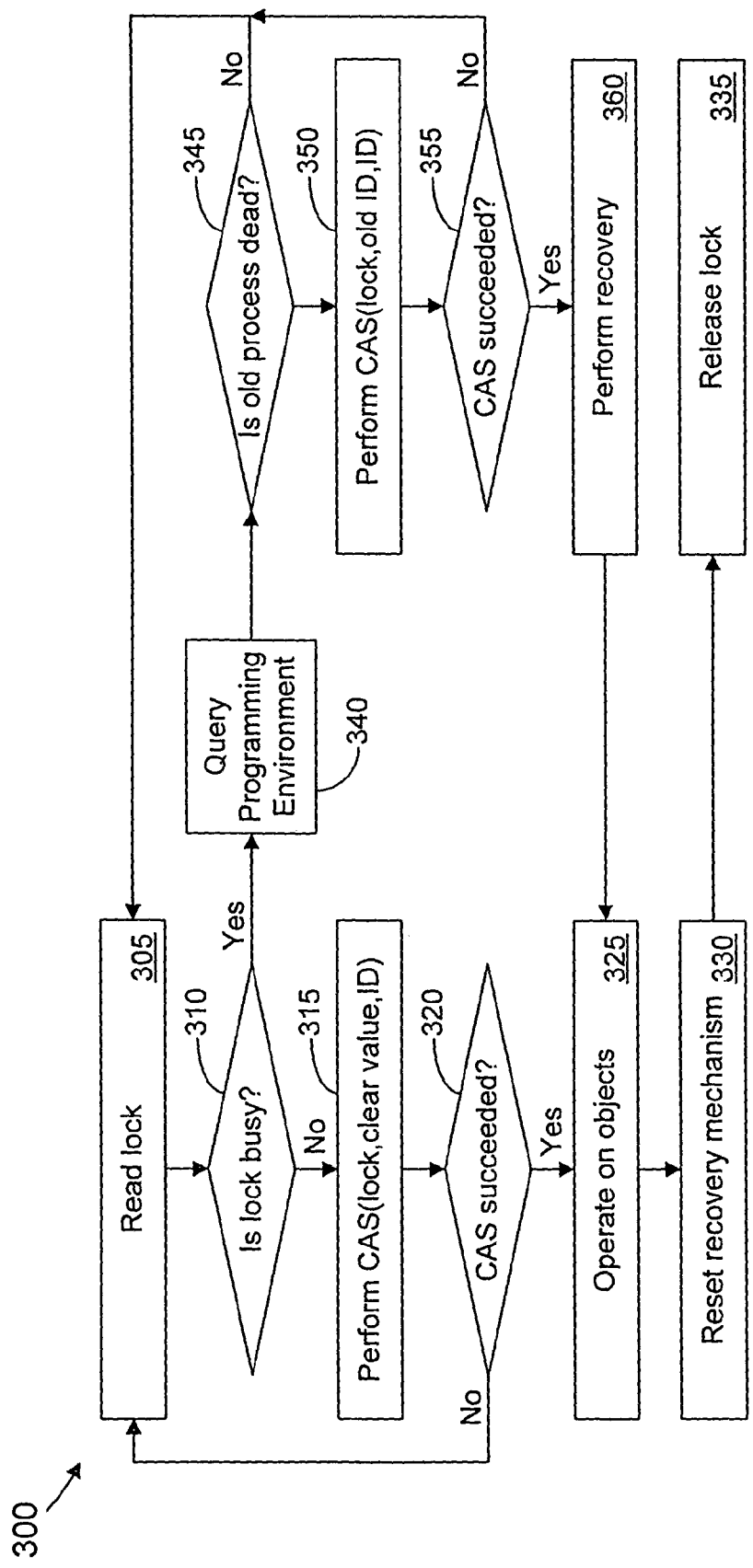
FIG. 3 depicts a flowchart representation of a fault-tolerant mutual exclusion lock executed on the shared memory computer system of FIG. 1, in accordance with one embodiment of the present invention.

Referring now to FIG. 3, a method 300 for implementing a fault tolerant mutual exclusion lock, in accordance with one embodiment of the present invention, is illustrated. The method 300 is based on the test-and-test-and-set lock described previously. Ideally, the method 300 is suited for small-scale and low contention systems. An acquiring process reads (at 305) the lock variable in the lock structure. The acquiring process checks (at 310) whether the lock structure is busy.

If the lock structure is not busy (i.e., the lock variable contains the clear value), the acquiring process attempts (at 315) an atomic operation Compare-and Swap (CAS). CAS is well-known to those skilled in the art and is implemented in various forms on almost all current processor architectures. CAS operates on a shared memory location and atomically compares its value to an expected value. If the values match, it writes a new value into the shared location. The CAS operation can be mathematically represented as the function, CAS(shared memory location, expected value, new value), wherein the function CAS accepts three variables and returns a boolean value indicating whether a replacement of values occurred. CAS returns a boolean value indicating whether the write took place. Conventionally, a value of zero indicates the write did not take place and a value of one indicates the write did take place. Although the present embodiment describes the use of the CAS operation, the present invention is not so limited and any method known to one skilled in the art for storing the process ID in the lock variable may be used.

Referring again to FIG. 3, the CAS is performed (at 315) on the lock variable (i.e., the shared memory location), the clear value (i.e., the expected value), and the process ID (the new value). The CAS is successfully performed if the process ID is written to the lock variable. If CAS is successfully performed (at 320) (e.g., a one is returned), the lock variable contains the process ID and the acquiring process is said to "hold the lock." The acquiring process then operates (at 325) on one or more shared data objects originally protected by the lock structure. The acquiring process resets (at 330) the recovery mechanism so that it includes information of the acquiring process accessing the lock variable and is ready for the next process to access the lock structure. The acquiring process releases (at 335) the lock. If the CAS is not successfully performed (at 320), the method 300 starts over and the acquiring process reads (at 305) the lock variable in the lock structure.

On the other hand, if the lock is busy (i.e., the lock variable contains an old ID of an old process that has previously acquired the lock structure), the acquiring process queries (at 340) the programming environment whether the old process is dead or alive using the old ID. If the old process is alive (at 345), the method 300 starts over and the acquiring process reads (at 305) the lock variable in the lock structure. If the old process is dead (at 345), the acquiring process performs (at 350) a CAS on the lock variable, the old ID (i.e., the expected value), and the process ID. The CAS is successfully performed if the old ID is replaced by the process ID. If the CAS fails (at 355) (e.g., a zero is returned), the method 300 starts over and the acquiring process reads (at 305) the lock variable in the lock structure. If the CAS succeeds (at 355) (e.g., a one is returned), the acquiring process performs (at 360) a recovery mechanism to recover the shared data objects to a consistent state such that the acquiring process can access the shared data objects. Many recovery mechanisms for recovering shared data objects are known to one skilled in the art and may be implemented in the present invention. Although not so limited, in one embodiment of the present invention, described in greater detail below, the recovery mechanism may keep a log of addresses pointing to shared data objects and values of the shared data objects. The acquiring process then operates (at 325) on the one or more shared data objects. The acquiring process resets (at 330) the recovery mechanism. The acquiring process releases (at 335) the lock.

Pseudo-code representations of various embodiments of the present invention will now be presented. The first pseudo-code representation illustrates a more sophisticated version of the lock based on the test-and-test-and set lock, as described above and in FIG. 3. The second and third pseudo-code representations illustrate queue-based lock implementations of the present invention.

The methods described below use a value, $\Delta t$, that constitutes an upper bound on most executions of critical sections. The methods are constructed in such a way that if every process finishes its critical section within $\Delta t$ time, the operating system function QueryOS is never called, thus greatly reducing the chance of unnecessary system calls. Generally, a process calls QueryOS only if at least $\Delta t$ time has passed after some other process started its critical section execution. If such a situation arises (either because some process died or became delayed in its critical section), then a waiting process may suspect that the process holding the lock is dead, and hence verify its status by calling QueryOS. The methods minimize overhead by avoiding multiple calls to QueryOS in a short time interval. In the first lock based on the test-and-test-and set lock, this is accomplished by requiring each process to write a timestamp to the central lock before calling QueryOS; timestamps must be at least $\Delta t$ time apart from each other. In the two queue-based lock, this is accomplished by requiring that a process waits for a time interval proportional to the distance of its node from the head of the lock queue. In any case, if the algorithm runs for a time interval t from lock initialization, then at most (t/Δt) calls to QueryOS are made.

The methods described below also ensure fast recovery. For example, consider the case where only the process holding the lock fails. If there are live processes waiting for the lock, then the algorithms guarantee that some process will call QueryOS after (Δt+ε) time (where ε is a short constant time interval), and will discover that the lockholder is indeed dead. Therefore, the time elapsed until recovery is bounded by Δt. If multiple processes fail, then (provided that some non-faulting process tries to acquire the lock) the time elapsed until recovery is bounded by nΔt, where n is the number of faulting processes. Therefore, the methods exhibit graceful performance degradation as the number of faulting processes increases.

Referring now to FIG. 4, a psuedo-code representation of the method for implementing a fault tolerant mutual exclusion lock as described above is illustrated. Two shared variables are used—LastHolder and LastChecked. LockHolder keeps the process ID of the current lock holder. If no process is holding the lock, LockHolder equals NULL. LastChecked keeps the last time the lock was acquired or QueryOS was called. QueryOS is an operating system call that is used to determine whether a process is dead or alive (e.g., Kill-0 on UNIX).

A process p tries to acquire the lock by first checking LockHolder (line A1). If the lock is available (i.e., LockHolder=NULL), p tries to acquire the lock by executing the CAS in line A2. If the CAS succeeds, p acquires the lock. Then, p updates LastChecked (line A3) and proceeds into its critical section. If the CAS fails, p starts over from line A1.

On the other hand, if p finds at line A1 that the lock is busy, i.e., LockHolder equals some other process ID, say, q, p checks if at least Δt (=THRESHOLD) time has passed since LastChecked was updated (line A4-A6). If not, then there are two possibilities, depending on which line updated LastChecked last: 1) less than Δt time has passed since q acquired the lock, or 2) less than Δt time has passed since some process has called QueryOS. In either case, p does not call QueryOS, and start over from line A1.

If more that Δt has passed, then at least Δt time has passed since q acquired the lock or since q was last checked for failure (by some other process calling QueryOS(q)). Therefore, in this case, p tries to update LastChecked using CAS in line A7. The CAS operation ensures that even if multiple processes execute up to line A7 simultaneously, only one of them succeeds in updating LastChecked, so on the average there is only one process per Δt interval that may call QueryOS.

If the CAS in line A7 succeeds, p proceeds to query the operating system by calling QueryOS(q) in line A8. If q is found alive, p starts over from line A1. Otherwise, p tries to usurp the lock by executing CAS on LockHolder in line A9. The CAS should succeed in most cases. The CAS may fail if p gets delayed for more than Δt time after its successful execution of the CAS in line A7 and some other process usurped the lock instead. If the CAS in line A9 succeeds, then p has acquired the lock. Thus p calls user recovery in line A10 and proceeds to execute its critical section.

As mentioned previously, the fault tolerant mutual exclusion locks illustrated in FIGS. 3 and 4 and described in detail above are based on the test-and-test-and-set lock, and, as such, are ideally suited for small-scale and low-contention systems. On other hand, queue-based locks are better suited for high-contention systems. Two methods for implementing the queue based lock will now be presented. In both methods, processes are arranged in a queue formation, as is commonly known to those skilled in the art. The queue formation includes three shared variables—Head, Tail, and Lock-Holder. Head and Tail point to the nodes at the head and the tail of the queue, respectively. LockHolder is used as a backup for Head. Lockholder identifies a lock-holding process if it dies after dequeuing its node from the queue but before completely releasing the lock.

A process p enqueues its node into the end of the queue by performing an Enqueue operation. This operation causes Tail to point top's node. If p is enqueued into a nonempty queue, then it waits on a spin variable until it is released by its predecessor. When releasing the lock, p dequeues itself by performing a Dequeue operation, which dequeues the head node (which must be p's node) and returns the address of the next node, if any. If p has a successor q, then p relinquishes the lock to q by updating q's spin variable. The two methods for implementing a queue based lock will now be described in greater detail.

Figure 5:
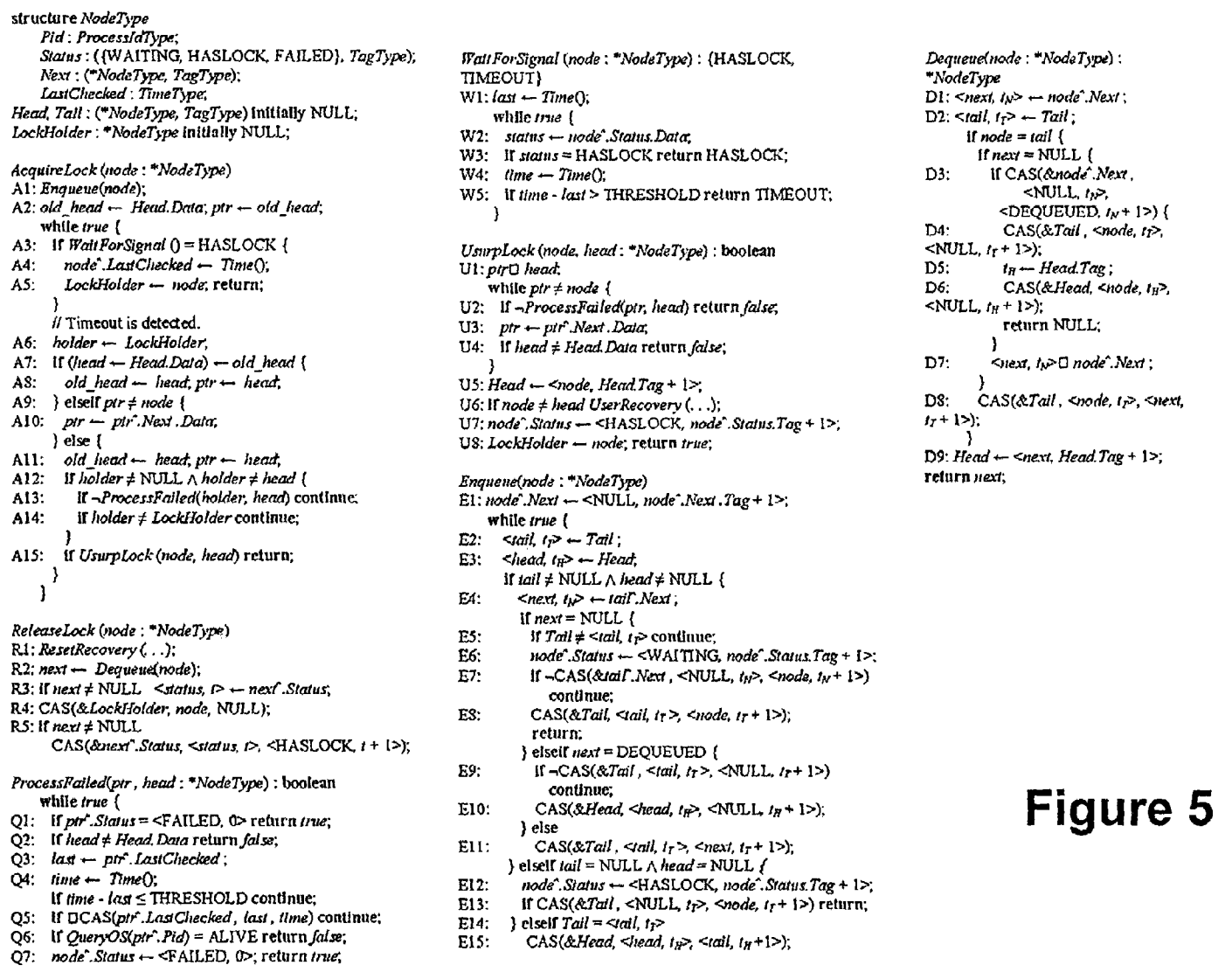

Referring now to FIG. 5, a psuedo-code representation of a method for implementing a fault-tolerant queue-based lock (FT-Q), in accordance with one embodiment of the present invention, is illustrated.

The method contains seven procedures: AcquireLock, ReleaseLock, WaitForSignal, UsurpLock, ProcessFailed, Enqueue, and Dequeue. The queue comprises nodes of NodeType. Each node is statically associated with a process and contains four fields: Pid (used in calling QueryOS), Status, Next, and LastChecked. The Status field contains one of the three values: WAITING (if the process does not have the lock), HASLOCK (if the process has the lock), or FAILED (if the process has failed and some other process determined that by calling QueryOS). The Next field points to the next node in the queue. The LastChecked field records the last time the process was found alive: this field is updated by the process itself when it enters the critical section (line A4), and by another process when QueryOS is called (line Q5, Q6). Its purpose is to limit the frequency of OS query per process. Operating system queries are generally expensive with respect to system resources. A goal of the present invention is to limit OS queries. For example, the method can include an upper bound limiting the frequency of calls to the operating system.

Some shared variables are augmented with a tag field (of TagType) to prevent the ABA problem. Associated with most uses of CAS is the ABA problem. If a thread reads a value A from a shared location, computes a new value, and then attempts a CAS operation, then the CAS may succeed when it should not, if other threads have changed the value of the shared location from A to B and back to A again. The simplest and most efficient solution to the ABA problem is to include a tag with the target location such that both are manipulated atomically, and the tag is incremented with updates of the target location. CAS succeeds only if the tag has not changed since the thread last read the location The two methods for implementing a queue based lock adopt the aforementioned approach for solving the ABA problem. The method based on the test-and-test-and-set lock is immune to the ABA problem. Various solutions for solving the ABA problem are well known in the art and may be implemented in the present invention.

In general, if a process fails during an Enqueue or Dequeue operation, then it is possible that other processes wait for the failed process forever, resulting in deadlock. This problem is alleviated by a lock-free queue mechanism. A concurrent method is "lock-free" if it always guarantees that some process will complete an operation in a finite number of steps. The underlying queue method, as described in the present application, gives an illusion that each Enqueue or Dequeue operation is executed in a single atomic step. Hence, if a process fails inside the enqueue or dequeue operation, then the resulting state is the same as either the operation did not take place or was completed. Therefore, even if some process fails at an arbitrary point of its execution, other live processes can make progress.

The present method supports two atomic operations, which are slightly different from normal queue operations:

(1) Enqueue(node): Atomically checks if the queue is empty and enqueues node.

(2) Dequeue(node): Atomically dequeues node and returns its successor (if any). Procedure Enqueue( ) performs the above operation by checking if the queue is empty, and setting node^.Status as either WAITING or HASLOCK accordingly. Procedure Dequeue( ) is simpler than a generic dequeue operation known to one skilled in the art because 1) a process calling Dequeue(node) already knows that node is at the head of the queue, and 2) only one process (namely, the one holding the lock) can call Dequeue( ) at a time.

Procedures AcquireLock( ) and ReleaseLock( ) are used, respectively, as entry and exit sections. Other procedures are called from these two procedures. A process p calls AcquireLock(p.node) as its entry section. The variable p.node is used to denote the pointer to the NodeType variable that is associated with p. Procedure AcquireLock(p.node) first enqueues p.node into the queue by calling Enqueue(p.node) (line A1), and then initializes two private variables, old_head and ptr (line A2). Variable ptr is used to traverse the queue from the head: at each iteration of the while loop (lines A3-A15), ptr is either advanced by one link or reset to the current value of Head. Variable old_head is used to check if Head changes while p is waiting.

In the following while loop (lines A3-A15), p repeatedly calls WaitForSignal (p.node) (line A3). Procedure WaitForSignal( ) waits until either p is signaled to take the lock (i.e., the predecessor of p establishes p.node^.Status=HASLOCK), or until a "timeout" occurs (i.e., p is not signaled to take the lock after Δt time has passed). In the former case, WaitForSignal( ) returns HASLOCK (line W3); in the latter, it returns TIMEOUT (line W5).

If all the processes preceding p finish their critical section execution "in time," process p's predecessor eventually signals p to take the lock by setting p.node^.Status to HASLOCK (by executing line R5), in which case WaitForSignal( ) returns HASLOCK and p proceeds to its critical section (lines A4, A5).

On the other hand, suppose that some process preceding p fails. To facilitate the discussion, the simplest case is first considered. Assume that q, the process holding the lock, has failed and p is the k+1$^{th}$ process in the queue. In this case, p waits for (k+1)Δt time by calling WaitForSignal( ) for k+1 times in its while loop. Note that p's private variable ptr is initialized to point to q at line A2, and advances by one link at each iteration of the while loop (line A10). Therefore, at the beginning of the k+1$^{th}$ iteration, p.ptr=p.node holds.

The present method is constructed in such a way that if the first n processes in the queue fail, then only the n+1th process is allowed to recover from the failure. Thus, if it successfully recovers from the failure, then it naturally becomes the new lockholder, without ambiguity. This precludes the possibility that multiple processes may attempt recovery at the same time. Therefore, if some process between p and q (i.e., one of $r_1, r_2, \ldots r_{k-1}$) is alive and has successfully recovered from the failure of q, then p need not (and should not) attempt recovery.

To guard against such a situation, at each iteration, p checks if Head is changed (line A7), and if so, resets ptr to the new value of Head and starts waiting again. Note that if some process rj between p and q has successfully recovered from the failure, then rj becomes the new lockholder. Accordingly, Head is necessarily changed to rj.node.

On the other hand, suppose that every process between q and p has either failed or become delayed. In this case, p successfully reaches the k+1$^{th}$ iteration, finds p.ptr=p.node at line A9, and attempts recovery by executing lines A11-A15. First, p checks if LockHolder is different from Head, which can happen if a process s, the predecessor of q, has successfully dequeued itself (by executing Dequeue( ), which is called at line R2), but has failed (or become delayed) before resetting LockHolder at line R4.

If LockHolder is indeed different from Head, then p does an additional check at line A13 to see if the process pointed by LockHolder (i.e., s) is alive. If s is alive (but merely delayed), then p should not attempt recovery, because it can interfere with the rest of s's execution of ReleaseLock( ). Similarly, even if p discovers that s is dead, if p finds that LockHolder has been updated by some other process at line A14, then p should not attempt recovery, because it happens only if some other process between p and q has updated LockHolder. Therefore, in either case, p starts all over again by continuing the while loop. Note that ptr and old_head are reinitialized at line A11 in this case.

On the other hand, if LockHolder indeed points to a dead process, or if LockHolder=NULL or LockHolder=Head holds (i.e., p skips lines A13 and A14), then the only remaining task to be done is to verify that every process before p (i.e., $q=r_0, r_1, r_2, \ldots, r_{k-1}$) is dead, and if so, usurp the lock. This is done by calling UsurpLock(p.node, head) at line A15.

Procedure UsurpLock( ) first calls ProcessFailed( ) repeatedly for all the processes preceding p to find out if they are indeed all dead. If p finds that even a single preceding process is alive, (i.e., if the call to ProcessFailed( ) at line U2 returns false, then the usurpation attempt is aborted, and UsurpLock( ) returns false. On the other hand, if p finds that all the preceding processes are dead, then p usurps the lock by executing lines U5-U8. In this case, process p first dequeues all the preceding (dead) processes by making Head to point to p.node (line U5), and calls the application-specific recovery procedure, UserRecovery( ), to recover from previous fault(s). Note that even though there can be multiple faulting processes, only one process may fail inside the critical section between each call to UserRecovery( ). After each such failure, a process that subsequently tries to enter the critical section must call UserRecovery( ) first. It should be noted that it is possible that UsurpLock( ) is called without any faults, if the LockHolder is delayed/dead and Head points top, with p=q. However, the if statement of line U6 guards against such a case.

After error recovery, p sets its Status field and LockHolder (line U7, U8), returns from UsurpLock( ) and from AcquireLock( ), and proceeds to its critical section. Finally, after p finishes its critical section, it calls ReleaseLock (p.node). Procedure ReleaseLock (p.node) dequeues p.node, and notifies its successor, if there is any.

Referring now to FIG. 6, a pseudo-code presentation of a method for implementing a fault-tolerant and premption-safe queue-based lock (FT-PS-Q), in accordance with one embodiment of the present invention, is illustrated. It is noted that the Enqueue( ) and Dequeue( ) operation of the FT-PS-Q (FIG. 6) are the same as the FT-Q (FIG. 5) and, as such, are not repeated in FIG. 6.

The FT-Q has the property that each process is served in a first-come first-served (FCFS) basis. While this is desirable when processes progress at comparable speeds, it can lead to a serious performance degradation in the presence of preemption. To alleviate this problem, a handshaking routine can be utilized. Upon releasing the lock, the lock-holding process (p) first checks if the successor (q) is "active" by updating a field (Signal) in the q's node. If q is busy-waiting, then it acknowledges the signal by updating p's Ack field, in which case p relinquishes the lock to q as in ordinary queue lock. If the acknowledgment does not appear within a certain amount of time, then p assumes that q is currently preempted, marks q's node as "removed," and throws it out of the queue.

The aforementioned technique can be also applied to the FT-Q, but only after careful coordination with the fault tolerance techniques described above. The FT-PS-Q provides both fault-tolerance and preemption-safety.

Procedure CheckPreemption( ) checks the succeeding process for preemption, as described above. If the successor acknowledges before a certain number (PREEMPTION_THRESHOLD) of idle iterations are made, then the procedure returns ACTIVE; otherwise, it returns PREEMPTED.

In the FT-PS-Q, a live process may be removed from the lock queue, possibly multiple times. Thus procedure AcquireLock( ) is now divided into two parts. Procedure TryLock( ) is almost identical to AcquireLock( ). It enqueues itself and waits until either it acquires the lock or is thrown out of the queue. Procedure PS-Acquire Lock( ) (PS stands for preemptionsafe) repeatedly calls TryLock( ) until it succeeds. Procedure PS-WaitForSignal( ) is also almost identical to WaitForSignal( ), except for the handshaking mechanism (lines w2-w5).

Procedure PS-ReleaseLock( ) repeatedly calls CheckPreemption( ) (line r4) until either an active process is found (lines r5, r6), or the queue is empty (i.e., next=NULL is established). Let p be the lock-holding process and q be the successor. If CheckPreemption( ) returns PREEMPTED, then p changes q's Status field into TO_BE_REMOVED (line r8), dequeues q (line r9), and then changes q's Status field into REMOVED (line r10). This two-step mechanism is required to ensure correctness if p dies between line r8 and r10, as follows. If p fails before committing the dequeue operation on q, then since Head points to q.node, q eventually recovers from the fault. On the other hand, if p fails after the dequeue operation (but before executing line r10), then q, inside TryLock( ), eventually finds that it is thrown out of the queue (line t9), and "properly" throws itself out by executing line t10. Since this handshaking mechanism is in effect only when there is a non-faulting lockholder, in case that the lockholder fails, reasoning that pertains to the FT-Q carries over to the FT-PS-Q.

As previously mentioned, in one embodiment of the present invention, the recovery mechanism may keep a log of addresses pointing to shared data objects and values of the shared data objects. Referring now to FIG. 7, one embodiment of the recovery mechanism is illustrated. Whenever a variable is updated inside the critical section, WriteAndLog is invoked to log the update. If, after a failure, UserRecovery( ) is called, then it simply undoes any update made by the previous (failed) execution of the critical section. UserRecovery( ) may be a user-defined procedure. ResetRecovery( ) may also be a user-defined procedure. It is called at the end of every critical section and serves to reset the recovery related variables to their default state.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of implementing a mutual exclusion lock in a computer the mutual exclusion lock capable of preventing at least one acquiring process from operating on at least one shared data object, the at least one acquiring process identified by at least one acquiring process ID, the mutual exclusion lock including at least one variable capable of storing the at least one acquiring process ID, wherein only the at least one acquiring process identified by the at least one acquiring process ID stored in the at least one variable can operate on the at least one shared data object, comprising the steps of:

reading the at least one lock variable in the lock structure;

checking whether the lock structure is busy;

if the lock structure is busy, such that the at least one lock variable contains an old ID of an old process that has previously acquired the lock structure, the acquiring process queries the programming environment whether at least one old process is dead or alive using at least one old ID, if the old process is alive, the method starts over and the acquiring process reads the at least one lock variable in the lock structure, if the old process is dead, the acquiring process performs a Compare-and-Swap (CAS) on the at least one lock variable, the at least one old ID and the at least one process ID, if the CAS fails, the method starts over and the acquiring process reads the at least one lock variable in the lock structure, if the CAS is successfully performed, such that the at least one old ID is replaced by the at least one process ID, performing a recovery mechanism for recovering the at least one shared data objects to a consistent state such that the acquiring process can access the at least one shared data objects, if the lock structure is not busy, such that the at least one variable contains a clear valve, the acquiring process attempts an atomic operation CAS on the at least one lock variable, the clear value and the at least one process ID;

if the CAS is not successfully performed, the method starts over and the acquiring process reads the at least one lock variable in the lock structure;

if the CAS is successfully performed, such that the at least one process ID is written to the at least one lock variable, operating on one or more shared data objects originally protected by the lock structure;

resetting the acquiring process via the recovery mechanism so that it includes information of the acquiring process accessing the at least one lock variable and is ready for the next process to access the lock structure, wherein the recovery mechanism keeps a log of addresses pointing to the at least one shared data shared objects and values of the at least one shared data objects; and releasing the lock.

* * * * *